Jan. 10, 1961   F. C. McNICOL ET AL   2,967,977
ELECTRICAL PROTECTIVE SYSTEM
Filed Nov. 19, 1956
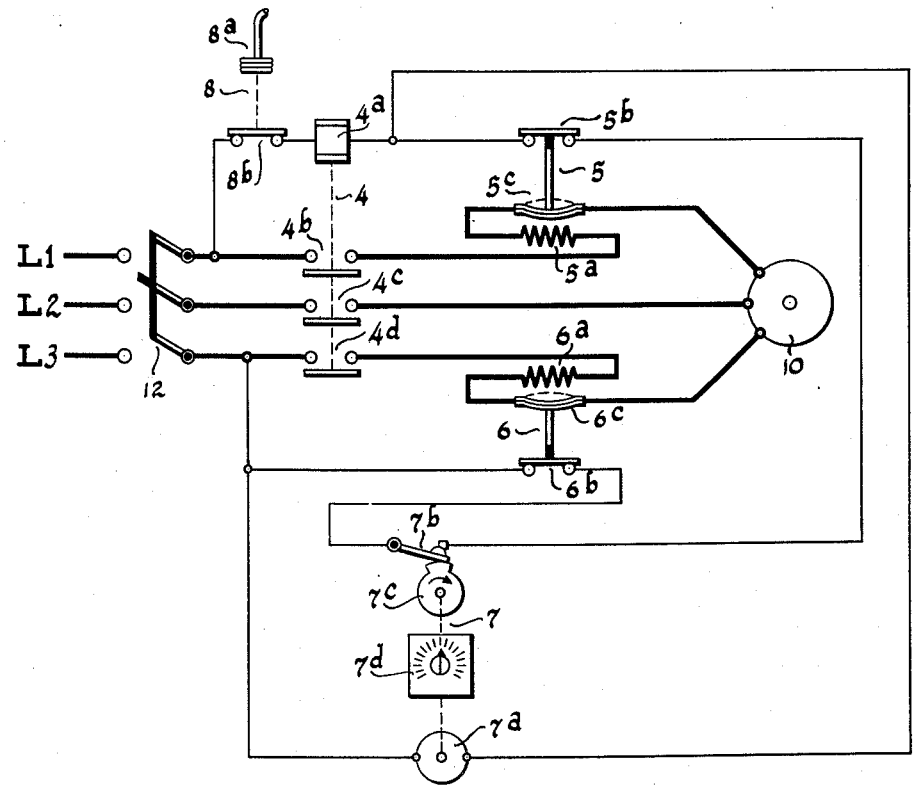
Inventors
Forrest C. McNicol
Theodore F. Rosing
By H. R. Ritter
Attorney United States Patent Office 2,967,977
Patented Jan. 10, 1961

2,967,977

ELECTRICAL PROTECTIVE SYSTEM

Forrest C. McNicol and Theodore F. Rosing, Milwaukee, Wis., assignors to Cutler-Hammer, Inc., Milwaukee, Wis., a corporation of Delaware Filed Nov. 19, 1956, Ser. No. 622,892

7 Claims. (Cl. 317—36)

This invention relates to improvements in electrical protective systems.

While not limited thereto, the invention is especially applicable to protective systems for electric motors.

When an overload condition occurs in an electric motor, provision is often made to protect the motor from damage by disconnecting it from its source of electrical power by means of some sort of protective mechanism which is responsive to the occurrence of the overload. Some overload responsive protective mechanisms are of such a nature that when an interval of time has elapsed after they have caused the electric motor to be disconnected they automatically reset thus permitting the electric motor to be reconnected to its source of power. In some instances the period of time during which the electric motor is prevented from being reconnected to its source of power by such mechanisms is of such short duration that reconnection takes place while the overload condition still exists or while excessively high temperatures still exist within the motor, which if maintained, may cause damage to the motor. In many instances, necessary changes in the duration of this time interval to compensation for various conditions cannot be readily accomplished.

It is desirable, therefore, to provide a control system which will automatically delay the reconnection of the motor to its source of supply for an additional interval of time after the aforementioned protective mechanisms would ordinarily permit such reconnection to take place in order to allow time for correction of the abnormal condition causing the overload or for cooling of the motor to a safe temperature.

Accordingly, it is an object of the invention to provide improved means affording the above mentioned control and protective functions for electric motors and other types of electrical apparatus.

A more specific object is to provide an electrical control system in which there are means to vary the interval of time during which the overload protective mechanism in the circuit is prevented from causing a motor or other electrical apparatus to be reconnected to its source of power.

A further object is to provide a system for delayed reconnection which is simple in design, contains a minimum number of components, operates automatically, and is adjustable to suit various conditions.

Other objects and advantages of the invention will hereinafter appear.

The accompanying drawing illustrates diagrammatically an embodiment of the invention which will now be described, it being understood that other embodiments are possible, and that the embodiment illustrated is susceptible of various modifications without departing from the scope of the invention as defined by the appended claims.

Referring to the drawing, it is seen that electrical power is supplied to a motor 10 from a power supply source (not shown) through a knife switch 12, normally open contacts 4b, 4c and 4d of an electroresponsive main contactor 4 and through heater coils 5a and 6a and thermal elements 5c and 6c of thermal responsive overload devices 5 and 6, respectively. Operating coil 4a is connected to supply line L1 by contacts 8b (shown in closed position) of condition responsive switch 8 which has an element 8a sensitive, for example, to temperature changes within a refrigerator to close or open contacts 8b to afford a means of control for energization of operating coil 4a.

In the embodiment shown, thermal responsive overload devices 5 and 6 are of a type which operate in the following manner. Excessive current flow in heater coils 5a and 6a resulting from an overload condition in motor 10 causes a predetermined rise in temperature within coils 5a and 6a. The heat thus generated in coils 5a and 6a causes expansion of thermal elements 5c and 6c, respectively, which in turn cause overload contacts 5b and 6b, respectively, to open. Overload contacts 5b and 6b remain open until thermal elements 5c and 6c, respectively, cool and return to their initial position permitting overload contacts 5b and 6b to close. The length of time overload contacts 5b and 6b remain open depends upon the temperature rise of coils 5a and 6a and the rate of cooling of thermal elements 5c and 6c. It is understood that the invention herein described is applicable to systems containing other forms of overload responsive devices than that described, provided those overload responsive devices are of a type which after causing their contacts to open automatically reclose those contacts after an interval of time has elapsed, that is, those having an automatic trip-reset cycle.

Heater coils 5a and 6a and thermal elements 5c and 6c are series connected in lines L1 and L3, respectively, between contacts 4b and 4d, respectively, and motor 10. Operating coil 4a of main contactor 4 is series connected with contacts 8b (shown in closed position) of a condition responsive switch 8, normally closed contacts 5b of overload protective device 5, normally closed contacts 7b of a motor driven timing device 7 and normally closed contacts 6b of overload protective device 6 across supply lines L1 and L3. Operating motor 7a of timing device 7 is connected across contacts 5b, 7b and 6b, and is also in series with closed contacts 8b of condition responsive switch 8 and with operating coil 4a of main contactor 4 across supply lines L1 and L3. The impedance of timer motor 7a with respect to the impedance of main operating coil 4a is so adjusted or preselected that when contacts 8b, 5b, 7b and 6b are normally closed and coil 4a is energized the current flow through coil 4a is sufficient to actuate main contactor 4 and close main contacts 4b, 4c and 4d but the current flow through timer motor 7a is not sufficient to energize timer motor 7a fully to cause cam 7c to open contacts 7b. Conversely, however, with the circuit interruption caused by either of contacts 5b, 7b or 6b being opened the series current flow through coil 4a and timer motor 7a will be such that it will drop sufficiently within coil 4a to a value effecting deenergization of main contactor 4 and opening of contacts 4b, 4c and 4d to disconnect motor 10 from lines L1, L2 and L3, but will have increased sufficiently within timer motor 7a to effect energization of timing device 7 to cause timer contacts 7b to open or remain open.

In the embodiment shown, timing device 7 operates in the following manner. Timer contacts 7b are normally closed. Upon full energization of timer motor 7a, cam 7c is rotated to permit timer contacts 7b to open. Timer contacts 7b remain open until the preselected rotational cycle of cam 7c is completed. The rotational speed of timer motor 7a is constant when the motor is fully energized and operating at its normal speed. However, timing device 7 has speed adjustment means 7d which permit the speed of the rotational cycle of cam 7c to be varied so that contacts 7b will remain open for a greater or lesser interval of time depending upon the setting of the speed adjustment means 7d which is selected. It is understood that forms of timing devices other than that described may be used, such as, but not limited to electrically operated timing devices having a constant interval of time between the opening and reclosing of their contatcs.

Upon the closing of knife switch 12 and with contacts 8b of condition responsive switch 8 in closed position an energizing circuit is established for operating coil 4a of main contactor 4 from line L1 through knife switch 12, contacts 8b, coil 4a, contacts 5b, 7b and 6b, knife switch 12 to L3. Because of the selection of impedance as between coil 4a and timer motor 7a, as explained previously, the current flow through timer motor 7a is negligible and timing device 7 is not actuated. However, main coil 4a is fully energized. Contactor 4 being thus energized, closes its contacts 4b, 4c and 4d to supply power to motor 10 from lines L1, L2 and L3. Current in lines L1 and L3 flows through heater coils 5a and 6a, respectively.

In the embodiment shown, with the motor 10 in operation the occurrence of an overload in motor 10 has the following effects. Current flow in excess of a predetermined amount through either or both of heater coils 5a and 6a will heat either or both thermal elements 5c and 6c sufficiently to cause opening of either or both of the contacts 5b and 6b. The circuit interruption following opening of either or both of overload contacts 5b and 6b has the effect of interrupting the current flow through the portion of the circuit containing contacts 5b, 7b and 6b and diverting all current flowing through contactor coil 4a through that portion of the circuit which contains electric timer motor 7a of timing device 7. The impedance of timer motor 7a with respect to that of main operating coil 4a is so adjusted or preselected that upon the opening of either or both of contacts 5b and 6b in response to the overload the value of the current flow in main operating coil 4a drops sufficiently to a value effecting deenergization of main contactor 4 and opening of contacts 4b, 4c and 4d to disconnect motor 10 from lines L1, L2 and L3, thus terminating the flow of current through heater coils 5a and 6a. However, as all of the current now flows through timer motor 7a its energization will be increased sufficiently to effect rotation of cam 7c to open contact 7b. Timer contacts 7b remain open until timing device 7 completes its rotational cycle of preselected duration. The duration of the time selected for maintaining contacts 7b in the open position must be longer than the trip-reset cycle of contacts 5b and 6b of overload responsive devices 5 and 6 to obtain delayed restarting of motor 10.

With contacts 4b, 4c and 4d open, motor 10 is inoperative and current in heater coils 5a and 6a has ceased flowing. When thermal elements 5c and 6c, or which ever one of them was actuated, cool sufficiently contacts 5b and 6b, or which ever one of them was opened, automatically reclose. Reclosure of both contacts 5b and 6b does not result in re-establishment of an energizing circuit for contactor 4 sufficient to cause contacts 4b, 4c and 4d to close as long as timer cam 7c maintains timer contacts 7b in the open position. However, when timer contact 7b does close upon the completion of the timed cycle of timer cam 7c, operating coil 4a of main contactor 4 is again series connected with closed contacts 5b, 7b and 6b across supply lines L1 and L3. Contactor 4 being thus fully energized closes contacts 4b, 4c and 4d and causes motor 10 to be reconnected to supply lines L1, L2 and L3. Simultaneously with the closure of contacts 7b and re-establishment of that portion of the circuit, current flow through timer motor 7a decreases sufficiently to stop its rotation and consequently contacts 7b remain in their normally closed position. Contacts 5b, 7b and 6b remain in their normally closed position until a subsequent overload condition in motor 10 again initiates the above described cycle.

Having described the invention in what is considered to be a preferred embodiment, it is readily understood that the invention is not thereby so limited but is applicable to system other than that described. Thus, the power supply may be either alternating or direct current. Loads other than the motor 10 shown may be protected. Furthermore, a number of main contacts greater or less than that shown may be in the system and other types of automatic trip-reset overload protective devices may be utilized in greater or lesser numbers than that shown. Other forms of timers than that shown may be used, and forms of control other than the condition responsive switch shown may be utilized.

We claim:

1. In a protective control system for an electrical load device, in combination, a source of electrical power, an electrical load device, an electroresponsive contactor operable to connect said load device to and disconnect it from said source and having an operating coil, control means for said contactor, an overload device having an overload responsive element connected in a circuit connection to said load device and having normally closed contacts which are opened upon response of said element to an overload and which automatically reclose after an interval of time, and a timing device having an electrical timer connected in series with the operating coil of said electroresponsive contactor across a side of said source and having normally closed contacts which are opened for an interval of time upon operation of said electrical timer, said last mentioned contacts connected in series with said operating coil of said contactor and said contacts of said overload device across said side of said source.

2. The combination according to claim 1 wherein said last mentioned interval of time is greater than said first mentioned interval of time.

3. The combination according to claim 2 wherein the impedances of said operating coil and said electric timer are so selected that upon the aforementioned opening of said normally closed contacts of said overload device the current flow through said operating coil will be insufficient to cause said electroresponsive contactor to maintain connection between said source and said load device but said same current flowing through said electric timer will be sufficient to cause said electric timer to open said normally closed contacts of said timing device.

4. The combination according to claim 3 wherein the impedances of said operating coil and said electric timer are so selected that upon re-closure of said contacts of said overload device and said contacts of said timing device the current flow through said operating coil will increase sufficiently to cause said electroresponsive contactor to re-establish the connection between said source and said load device but the portion of said current now flowing through said electric timer will decrease to a value insufficient to cause said electric timer to open said normally closed contacts of said timing device.

5. The combination according to claim 4 wherein said timing device comprises means which permit the length of time said electric timer maintains said contacts of said timing device in open condition to be increased or diminished.

6. The combination according to claim 5 wherein said timing device comprises an electric timer motor and adjustment means to preselect the interval of time said electric timer motor maintains said normally closed contacts of said timing device in open condition.

7. In a protective system for a load which is energizable from an electrical power supply source, in combination, an electroresponsive device energizable from the source and being operable to connect the source to the load and to disconnect the source from the load, overload responsive actuator means of the self-resetting type in circuit with the load and having first switch means for controlling said electroresponsive device, timing means in circuit with said electroresponsive device and having second switch means for controlling said electroresponsive device, means connecting said first and second switch means normally to render said electroresponsive device effective and to render said timing means ineffective, said actuator means being responsive to an overload condition in the load circuit to operate said first switch means to render said electroresponsive device ineffective thereby to cause the latter to disconnect the source from the load and from said actuator means, disconnection of said source from said actuator means causing the latter to reset thereby to restore said first switch means, said operation of said first switch means also rendering said timing means effective to operate said second switch means for a predetermined time interval thereby to maintain said electroresponsive device ineffective and said timing means effective following restoration of said first switch means, and said timing means operating at the end of said time interval to restore said second switch means thereby to render said timing means ineffective and to cause said electroresponsive device to reconnect the source to the load.

References Cited in the file of this patent
UNITED STATES PATENTS

| | | |
|---|---|---|
| 1,530,443 | Traver | Mar. 17, 1925 |
| 1,635,061 | Traver | July 5, 1927 |
| 1,658,695 | Traver | Feb. 7, 1928 |
| 2,014,949 | Neher | Sept. 17, 1935 |
| 2,046,962 | Mott | July 7, 1936 |
| 2,763,815 | Wallace | Sept. 18, 1956 |